United States Patent [19]
Do et al.

[11] Patent Number: 5,485,324
[45] Date of Patent: Jan. 16, 1996

[54] DOUBLE-DECK CAMCORDER WITH PERPENDICULARLY INSTALLED HEAD DRUM

[75] Inventors: In Rok Do; Do Young Choi, both of Suweon, Rep. of Korea

[73] Assignee: SamSung Electronics Co., Ltd., Suwon, Rep. of Korea

[21] Appl. No.: 907,124

[22] Filed: Jul. 1, 1992

[30] Foreign Application Priority Data

Oct. 16, 1991 [KR] Rep. of Korea ................ 91-18209

[51] Int. Cl.⁶ ............................ G11B 5/027; G11B 5/008
[52] U.S. Cl. .................................................. 360/85; 360/95
[58] Field of Search ........................... 360/85, 95, 96.5, 360/96.3

[56] References Cited

U.S. PATENT DOCUMENTS

| | | | |
|---|---|---|---|
| 4,414,536 | 11/1983 | Yamanaka | 360/96.3 |
| 4,635,196 | 1/1987 | Koda et al. | 360/96.3 |
| 4,730,792 | 3/1988 | Jang | 360/96.3 |
| 4,747,564 | 5/1988 | Tsubota | 360/96.3 |
| 4,796,115 | 1/1989 | Ohshima et al. | 360/95 |
| 4,807,064 | 2/1989 | Miyamoto et al. | 360/95 |
| 4,959,739 | 9/1990 | Tsutsumi et al. | 360/95 |
| 4,964,001 | 10/1990 | Hirayama et al. | 360/96.5 |
| 4,984,105 | 1/1991 | Hwang | 360/85 |
| 5,016,125 | 5/1991 | Takeda et al. | 360/85 |
| 5,050,022 | 9/1991 | Aizawa | 360/96.5 |
| 5,060,094 | 10/1991 | Chung et al. | 360/96.5 |
| 5,062,015 | 10/1991 | Maeng | 360/96.5 |
| 5,220,469 | 6/1993 | Nagata | 360/85 |
| 5,233,489 | 8/1993 | Kim | 360/85 |
| 5,258,881 | 11/1993 | Machara et al. | 360/85 |
| 5,299,076 | 3/1994 | Park | 360/96.3 |

Primary Examiner—A. J. Heinz
Assistant Examiner—David D. Davis
Attorney, Agent, or Firm—Robert E. Bushnell

[57] ABSTRACT

A video camera deck driving apparatus and a control method thereof are disclosed. In the video camera deck driving apparatus, the deck of the video camera comprises a main deck and a sub-deck in a separate form, and a drum installed on the main deck perpendicularly, wherein a tape guide member and other components are improved to be suitable to the perpendicular drum and the sub-deck slides over the main deck in such a manner that the drum and the cassette can be closely approached to each other, thereby reducing the size of the deck.

19 Claims, 13 Drawing Sheets

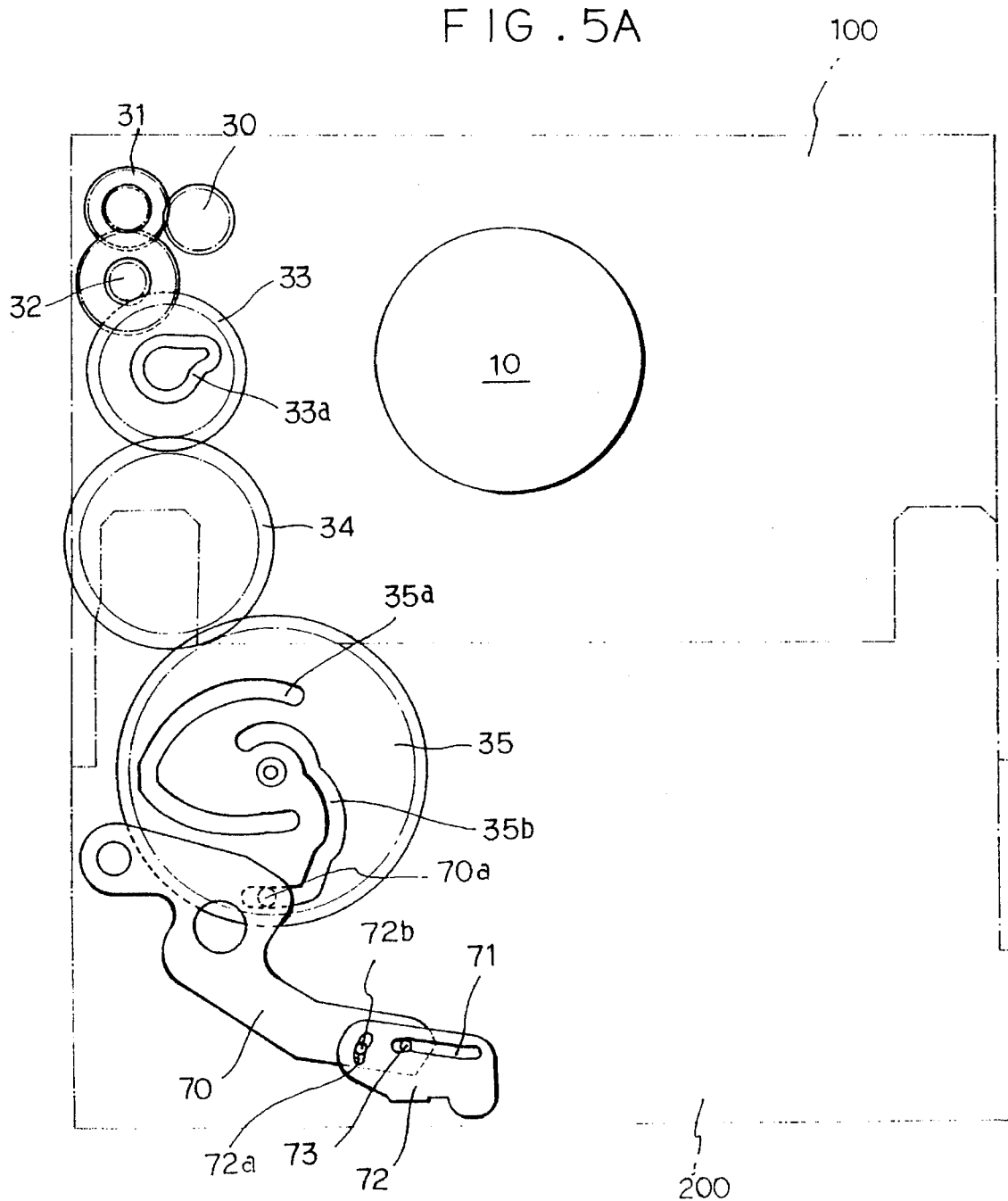

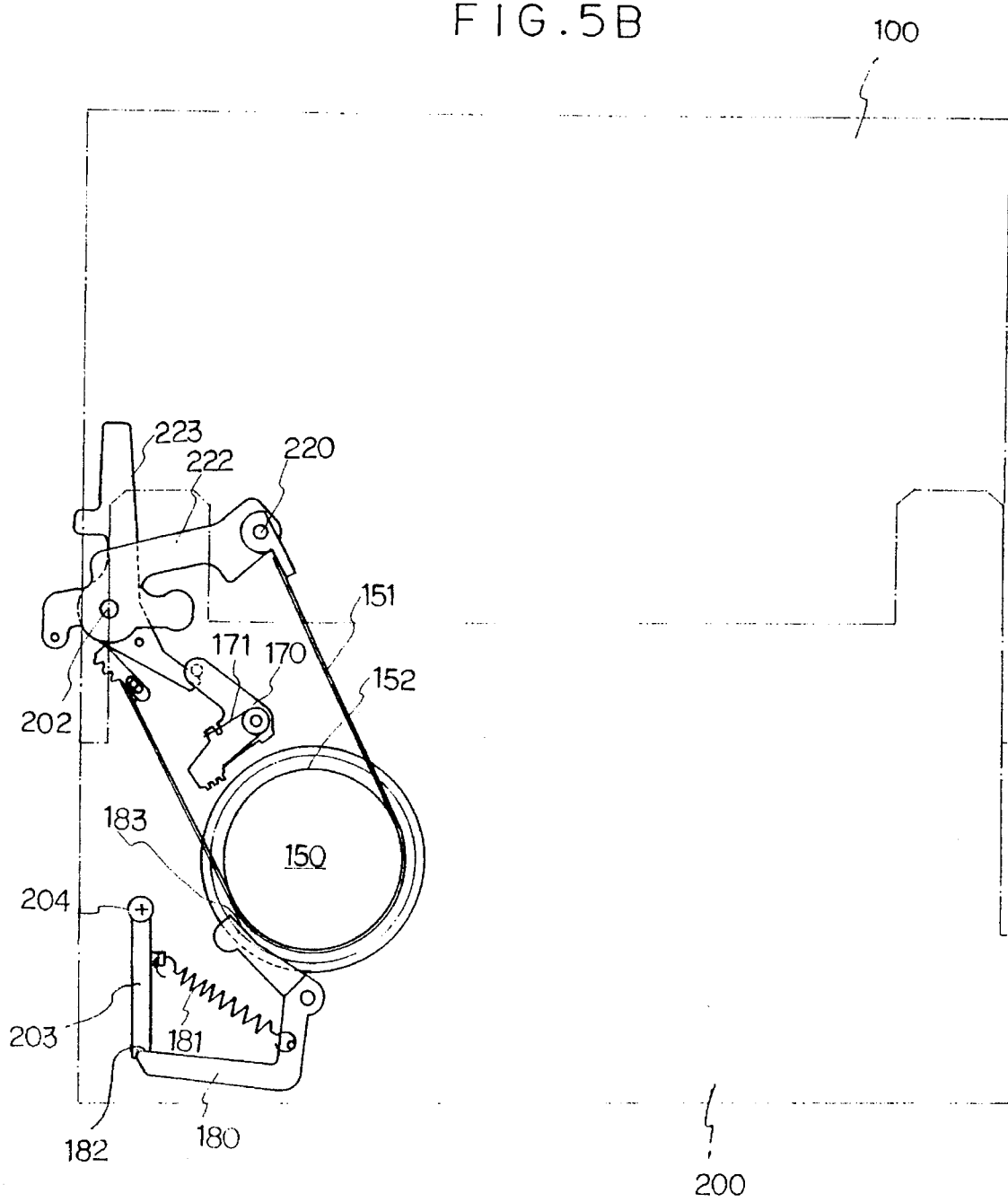

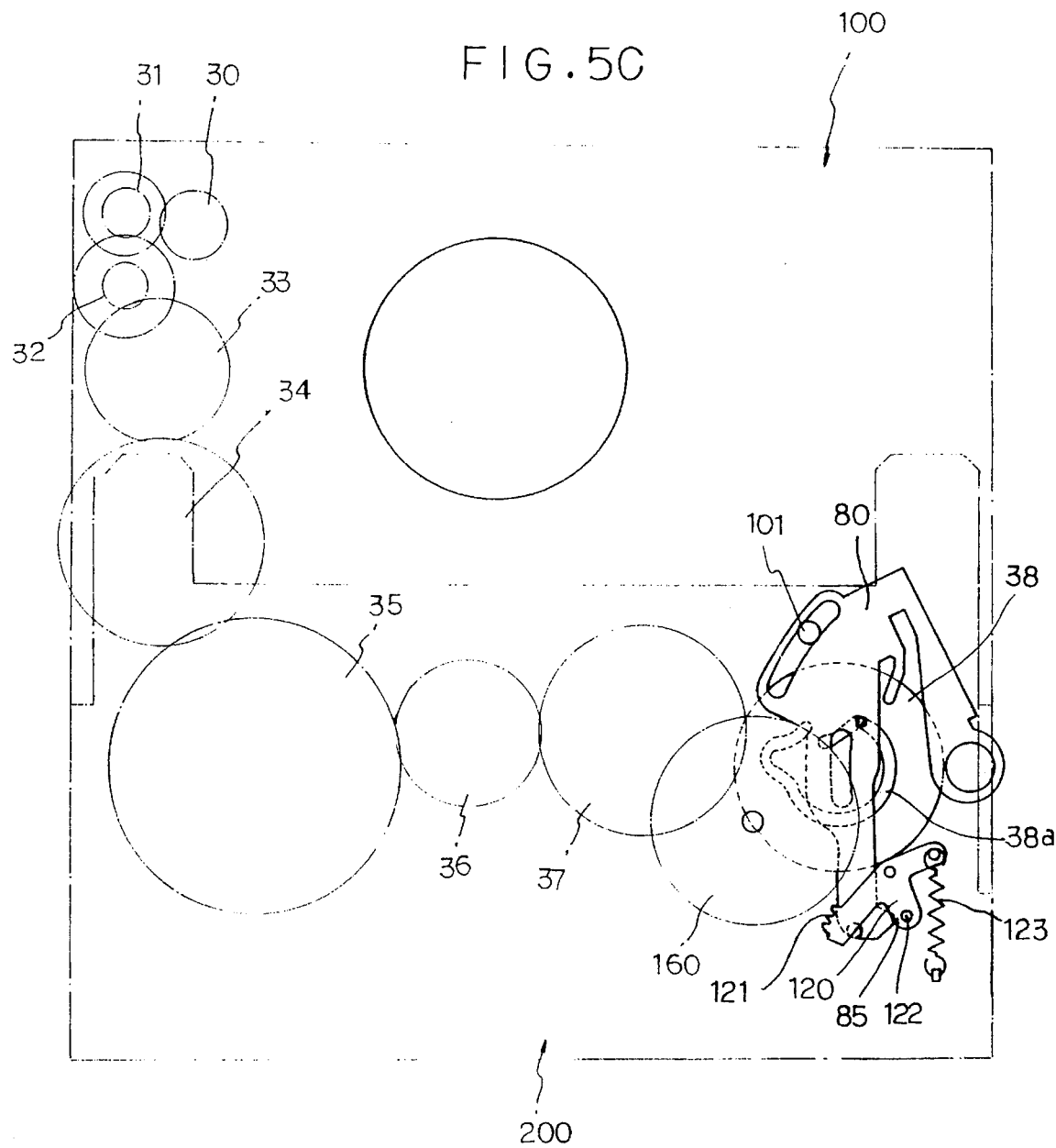

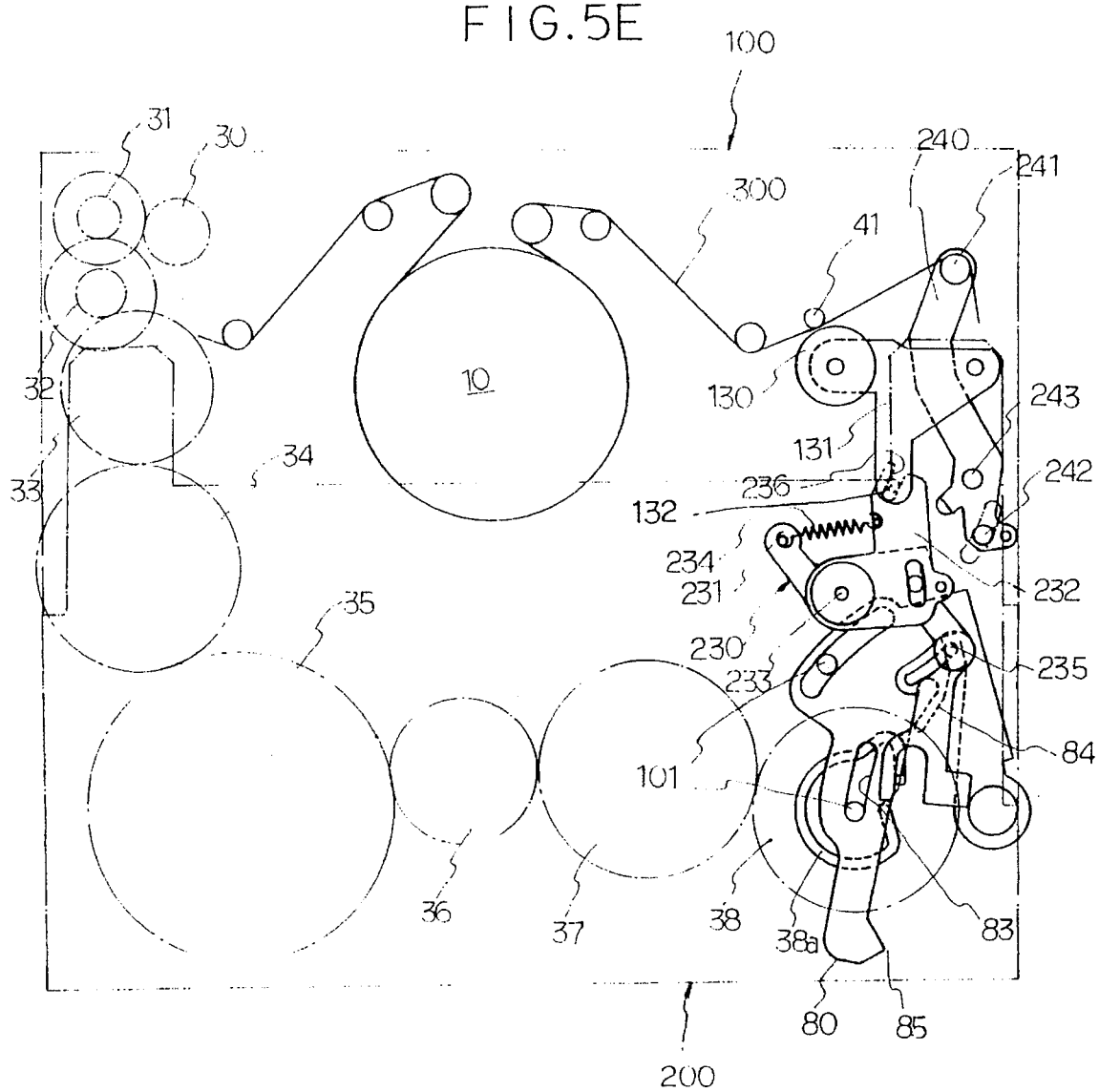

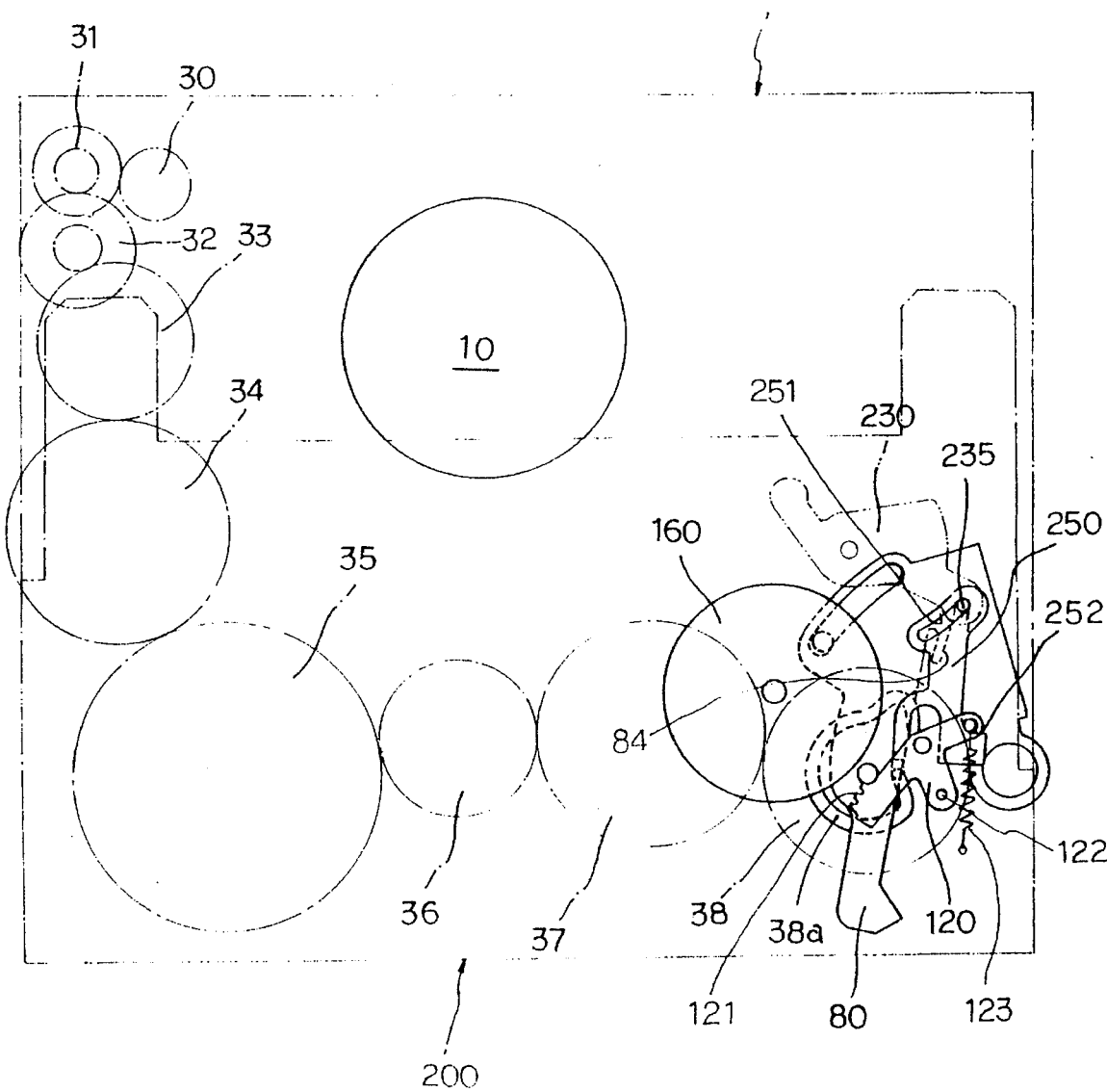

DOUBLE-DECK CAMCORDER WITH PERPENDICULARLY INSTALLED HEAD DRUM

FIELD OF THE INVENTION

The present invention relates to a video camera in which functions of a video tape recorder and a camera are combined together, and more particularly to, a video camera deck driving apparatus and a control method thereof, in which the size of the video camera deck is reduced to a great degree, thereby making it possible to miniaturize the video camera.

BACKGROUND OF THE INVENTION

Conventional video cameras are classified into two types. One of them has a single deck, while the other has double decks, that is, a main deck and a sub-deck. First, the video camera having a single deck includes a drum having a head for recording or regenerating video signals, a loading device for loading a tape to the drum, two reels for installing a tape, and driving means for driving the loading device and the reels. The above components are integrated in only one deck so as to record and regenerate video signals.

However, in this type of video camera, all the components required for regenerating signals should be installed on a single deck, and therefore the size of the deck becomes large, with the result that the video camera as a portable one is accompanied by much inconvenience.

Meanwhile, in the other type of deck having a main deck and a sub-deck in a separate form, the components required for regenerating signals are dispersed to the main deck and the sub-deck, and therefore it is possible to reduce the size of the deck to some degree.

However, there is also a limit to reducing the size of the deck because of the following reasons in the double-deck type. That is, a drum is installed at a proper position on the main deck in an inclined form, and sub-deck for loading a tape is slidably installed on the main deck. Therefore, the height of the deck is increased as much as the drum is inclined.

Further, if the sub-deck excessively approaches to the drum, there is a possibility that the case of the tape on the sub-deck can contact the drum because of the inclined installation of the drum.

Consequently, the deck of the conventional video camera becomes enlarged not only in its height but also in its length, and therefore, there is a limit in miniaturizing the deck with the result that the video camera itself is increased in its size.

SUMMARY OF THE INVENTION

The present invention overcomes the above described disadvantages or the conventional techniques and provides a video camera deck driving apparatus and a control method thereof, in which the size of the deck is reduced not only in its height but also in its longitudinal length, by installing a drum uprightly on a main deck, and by so forming a sub-deck as to closely approach the drum.

The present invention comprises the video camera having a main deck with a drum installed thereon, a sub-deck movably installed on the main deck, a drum installed on the main deck in an upright form, tape guide means for guiding a tape toward the uprightly installed drum sub-deck moving means for moving the sub-deck toward the drum so as for the sub-deck to closely approach the drum for loading the tape, and a drum base with upper and lower loading slots separately formed thereon for guiding a pole base to the drum.

The control method for the video camera deck according to the present invention comprises an ejecting step for moving a sub-deck inward and outward on a main deck, opening a housing, and braking a supply reel and a take-up reel, an unloading step for inserting a tape into said housing and locking said housing to said sub-deck, an end sensing step for releasing said take-up reel after detecting the position of said tape load said tape, a sub-loading step for preparing for loading said tape by moving said sub-deck over said main deck and by overlaying said sub-deck and said main deck evenly, a play-back step for actuating a pole base and making a pinch roller pressingly contact a capstan shaft to load said tape and to regenerate pictures, and a standby step for stopping said two reels and separating said pinch roller from said capstan shaft to make a regenerated picture stationary and to return to a desired step.

BRIEF DESCRIPTION OF THE DRAWINGS

The above object, and other advantages of the present invention will become more apparent by describing in detail the preferred embodiment of the present invention with reference to the attached drawings, in which:

FIGS. 5A to 5E illustrate the operations of the present invention, in which:

FIG. 5A is a plan view showing the movement of a sub-deck on a main deck;

FIG. 5B illustrates the operation of a soft brake;

FIG. 5C illustrates the operation of a main brake for controlling a take-up reel;

FIG. 5D illustrates the operation of a pole base;

FIG. 5E illustrates the operation of a pinch roller;

FIG. 5F illustrates the operation of the main brake for releasing the take-up reel.

DESCRIPTION OF THE PREFERRED EMBODIMENT

Figure 1:
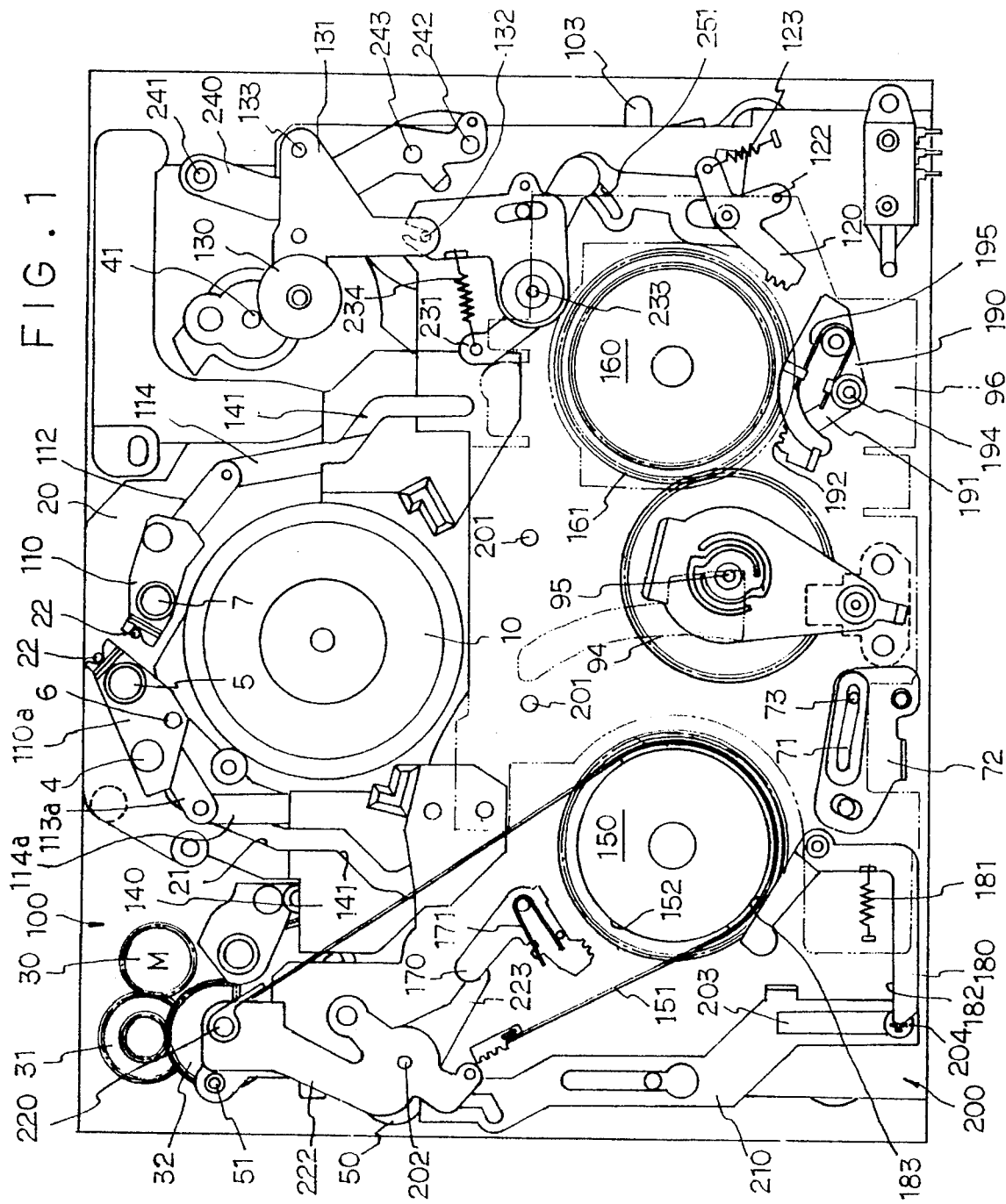
FIG. 1 is a plan view of a deck of a video camera according to the present invention.
Figure 2:
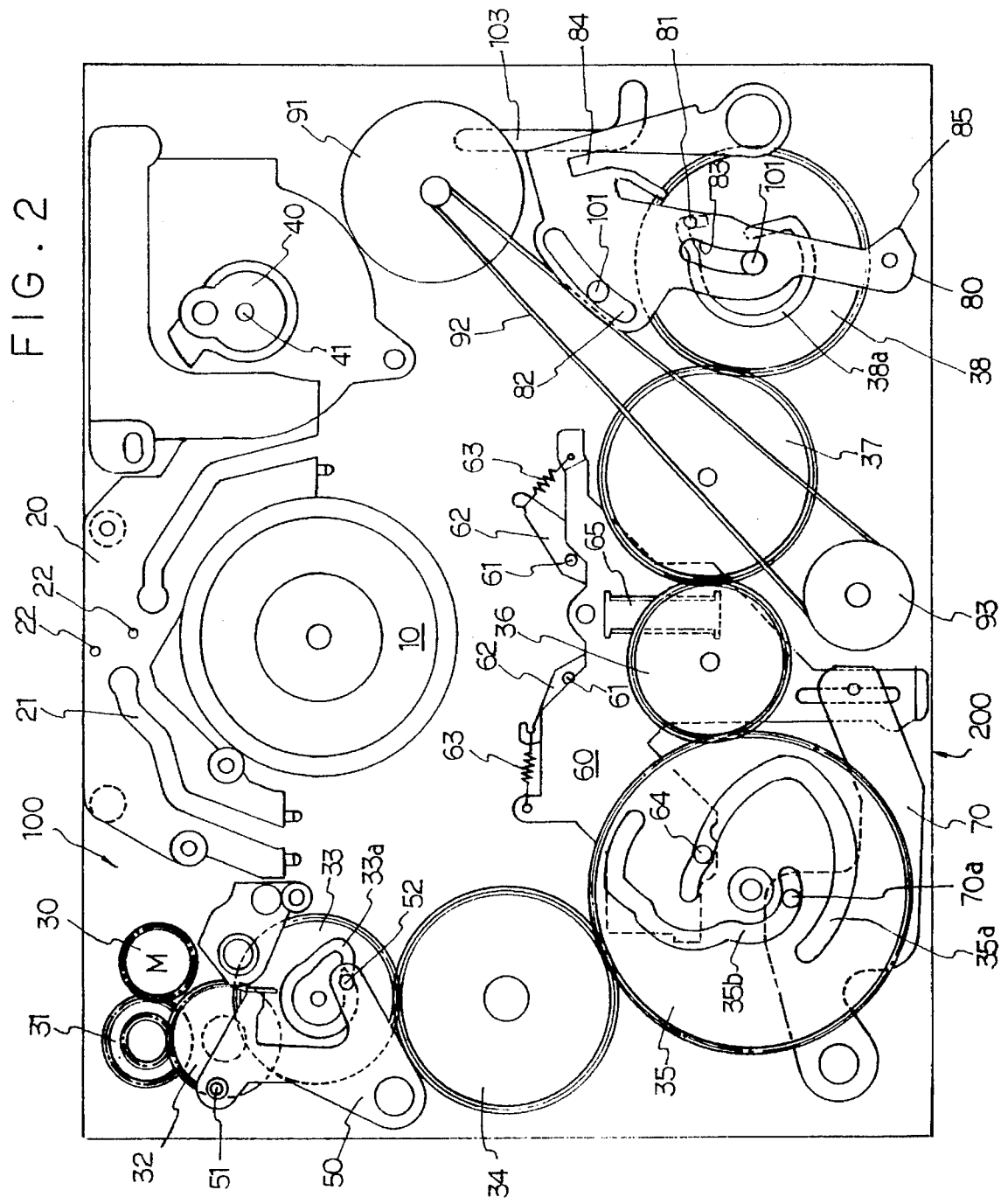
FIG. 2 is a plan view of a main deck according to the present invention.
Figure 3:
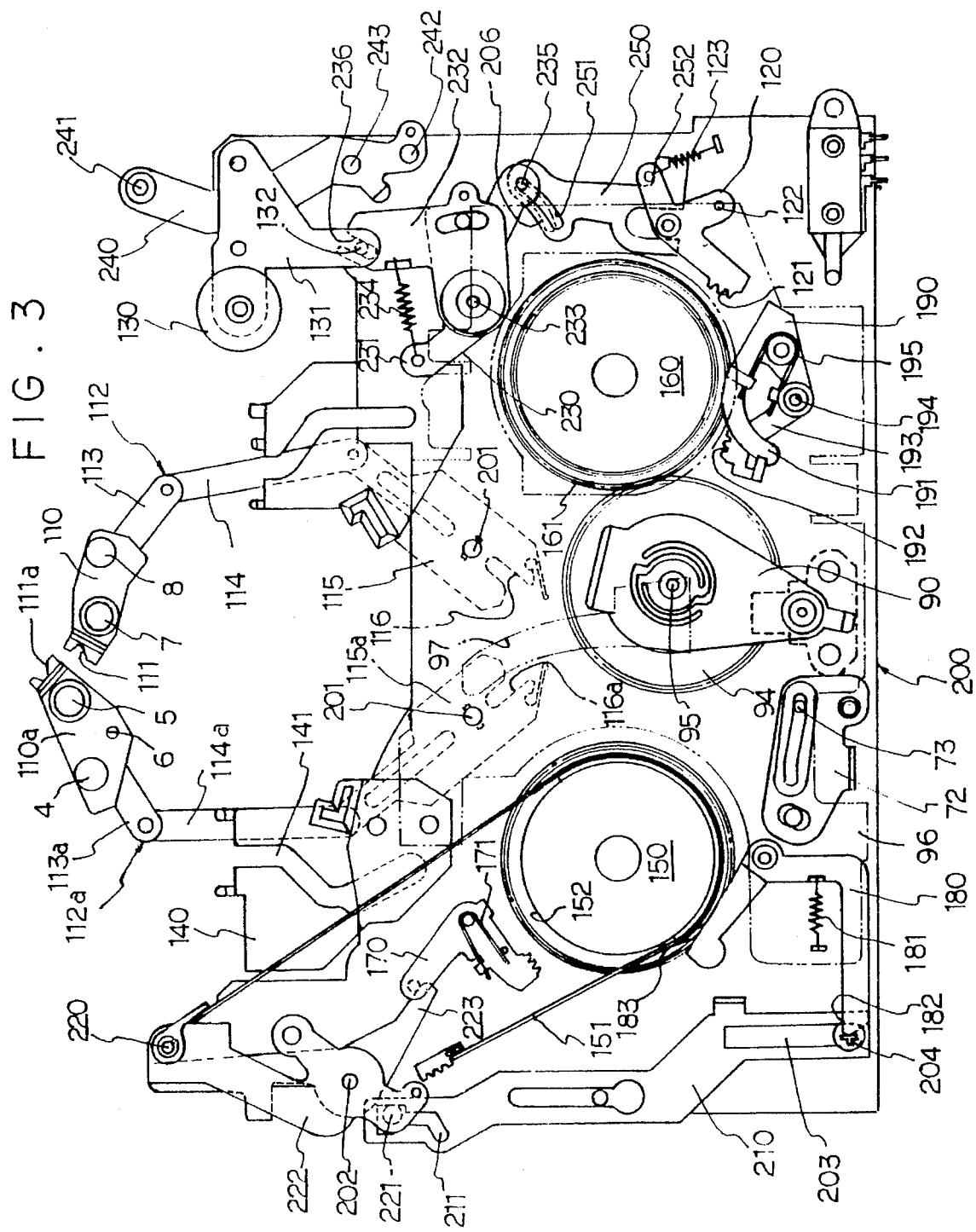
FIG. 3 is a plan view of a sub-deck according to the present invention.

FIGS. 1 to 3 illustrate the constitution of the apparatus of the present invention, and also illustrate the movements of a sub-deck 200 over a main deck 100. As shown in these drawings, the sub-deck 200 is installed separately on the main deck 100 in such a manner that a cassette tape and a drum 10 can be closely disposed to each other. The drum 10 is uprightly installed on the main deck 100, and the sub-deck 200 is made slidable on the main deck 100 by a sub-deck moving means.

At a outside of the upright drum 10, there is installed a tape guide means for guiding a tape toward the drum 10. This tape guide means includes a tension pole 220 and a first guide roller 2 for guiding a tape 300 in parallel with the main deck 100 after the tape 300 is released from a supply reel 150, a first inclined pole 3 and a second inclined pole 4 for guiding the tape 300 in an inclined direction with a certain angle after the tape 300 is released from the first guide roller 2, a second guide roller 5 for changing the running direction of the tape after the tape is guided by the second inclined pole 4, a guide pole 6 for guiding the tape in an inclined direction with certain angle to wind the tape to the drum 10 after the change of the running direction of the tape, a third guide roller 7, a third inclined pole 8 and a fourth inclined pole 9 for guiding the tape 300 in an upwardly inclined direction after the tape is released from the guide pole 6 and wound on the drum 10, a capstan shaft 41 driven in contact with a pinch roller 130, for guiding the tape 300 in parallel with the main deck 100 after the tape 300 is released from the fourth inclined pole 9, and a review arm pole 241 for guiding and supplying the tape 300 to a take-up reel 160 after the tape 300 is guided out by the contact-driving force of the capstan shaft 41 and the pinch roller 130.

Now the main deck 100 and the sub-deck 200 will be described separately below.

First, the main deck 100 will be described referring to FIG. 2.

On the main deck 100, the drum 10 is uprightly installed at an upper middle portion thereof, and a drum base 20 also is installed a drum base 20 which has a pair of loading slots 21 for guiding the pole base which in turn makes the tape contacted with the drum so as for the tape to be guided by it. The loading slots 21 have different bottom heights respectively so as for them to be fit to the upright drum 10.

Further, installed on the main deck 100 are a loading motor 30 a power transmitting mechanism driven by the loading motor 30; a capstan motor 40 installed on the other side of the drum 10, for moving the tape, a tension pole actuating lever 50 driven by a first cam gear 33 of the power transmitting mechanism, a plate slider 60 and a sub-deck moving lever 70 actuated by a second cam gear 35, and a lever 80 actuated by a third cam gear 38.

A gear 91 is installed and engaged with the capstan motor 40 on a side of the capstan motor 40, while an idler actuating pulley 93 connected through a belt, 92 to the gear 91 is installed below the plate slider 60. On the drum base 20, there is installed a stopper pin 22 by which stoppers 111 and 111a of pole bases 110 and 110a (to be described below) are to be hung onto the upper end of the loading slots 21. The components of the power transmitting mechanism are engaged with each other in the sequence of the loading motor 30—the driving gear 31—the first gear 32—the first cam gear 33—the second gear 34—the second cam gear 35—the third gear 36—the fourth gear 37—the third cam gear 38.

The first cam gear 33 is provided with a cam slot 33a, and the cam slot is coupled with a guide pin 52 and a tension pole contacting protuberance 51. The guide pin 52 guides the tension pole actuating lever 50 hinge-secured to a position on the bottom of the main deck 100.

The second gear 34 is provided with switches for controlling the signals of respective modes, so that the deck of the present invention should be operated successively for the respective modes.

The second cam gear 35 is provided with a first cam slot 35a and a second cam slot 35b, and the first cam slot 35a lifts and lowers the plate slider 60, while the second cam slot 35b guides the sub-deck actuating lever 70.

A pair of levers 62 having pins 61 at the centers thereof are resiliently installed at the plate slider 60 by means of springs 63, and a guide pin 64 is guided within the first cam slot 35a. Further, the plate slider 60 is provided with a guiding portion 65 at the center thereof, so that it should be guided by a guide protuberance formed on the main deck 100.

The third cam gear 38 is provided with a cam slot 38a for guiding a lever 80 for actuating the pinch roller 130 and the main brake 120 for braking in turn the take-up reel of the sub- deck 200.

One end of the lever 80 is hinge-secured to a proper position on the main deck 100, so that it can be pivoted by the third can gear 38 within a certain angular range, and therefore a guide pin 81 which is projected from the bottom of the lever 80 is guided along the guide slot 38a. The lever 80 is further provided with elongate slots 82 and 83 to be guided during the revolutions of the third cam gear 38, and therefore the lever 80 is guided towards screw members 101 installed on the bottom of the main deck 100 and on the third can gear 38.

Further, a guide slot 84 is formed near one end of the lever 80 to actuate the review arm and the pinch roller (to be described below) while a contact protuberance 85 is formed at the lowest end of the lever 80 in order to actuate the main brake 120 (to be described below).

FIG. 3 is a plan view showing the constitution of the sub-deck 200. Under the both sides of the drum 10 of FIG. 1 and 2, there are installed a pair of rail guides 140 having a loading slot 141 respectively contacted with the drum base 20. The rail guides 140 guide a pair of loading arm assemblies 112 and 112a which are hinge-connected to a pair of pole bases 110 and 110a at the tips thereof.

The pole bases which are connected to the leading ends of the loading arm assemblies consist of a supply side pole base 110a and a take-up side pole base 110. Both of the pole bases 110 and 110a are provided with stoppers 111 and 111a (having V shaped recesses) to be engaged with stopper pins 22 of the drum base 20 at the leading ends thereof. Further, the pole bases 110 and 110a are also provided with second and third guide rollers 5 and 7 and second and third inclined poles 4 and 8 so as to face against the upright drum 10. Further, the supply side pole base 110a is also provided with another guide pole 6.

Further, under the pole bases 110 and 110a, there are installed loading arm assemblies 112 and 112a which are formed by pin-coupling first arms 113 and 113a, second arms 114 and 114a, and loading arms 115 and 115a separately a pair of the loading arms 115 and 115a are hinge-coupled with a hinge portion 201 which are formed on the bottom of the sub-deck 200. On the sides of the loading arms 115 and 115a, there are formed slots 116 and 116a for guiding the pins 61 of the levers 62 which are resiliently installed on the plate slider 60.

The supply reel 150 and the take-up reel 160 are installed under the rail guides 140 respectively, and the main brakes 120 and 170 are installed on the sides of the reel 150 and 160. The supply reel 150 is provided with a soft brake 180 and a tension band 151, while the take-up reel 160 is provided with a sub-brake 190.

Further, a tension pole driving divide and a main braking device are installed on a side of the supply reel 150. Meanwhile, at a side of the take-up reel 160, there are installed the lever 80 actuated by the third cam gear 38, a pinch roller driving device actuated by the lever 80, a review arm driving device, and a main brake releasing device.

Between the two reels 150 and 160, there is installed an idler 90 for selectively driving the reels, which includes a gear 94 selectively engaged with the two reels 150 and 160 and a gear pulley connected to a pulley 93 for receiving power from the capstan motor 40. The gear pulley is provided with a protuberance 95 at the leading end thereof, so that it should be guided along a guide slot 97 of a reel cover 96 which is mounted upon the idler.

As shown in FIGS. 1 to 3 and 5G, the tension pole driving device which is installed at a side of the supply reel 150 is provided with a downward projecting protuberance 221 at a side thereof, so that it should be pivoted and guided along a guide slot 211 of a slide tension pole 210 which is lifted and lowered at a side of the sub-deck 200. Meanwhile, at another side of the tension pole driving device, there extends a tension arm 222 having a tension pole 220, hinge-secured to the sub-deck 206.

As shown in FIGS. 1 to 3 and 5G, the main braking device of the supply reel 150 operates as described below. The protuberance 51 of the tension pole actuating lever 50 actuated by the first cam gear 33, pushes the lever 223 hinge-coupled with the hinge portion 202 together with the tension arm 222. Then the other end of it releases the main brake 170, so that the supply reel 150 should be braked by the spring unit 171.

Meanwhile, as shown in FIG. 5B, the soft brake 180 installed under the supply reel 150 is hinge-secured to the sub-deck 200, and is provided with a spring unit 181 so as to press the outer face of the tension band 151 wound around the supply reel 150. Further, this soft brake 180 is installed on the main deck 100.

A pushing face 182 of the soft brake 180 is pushed by means the screw member 204 which pass through the elongate slot 203 of the sub-deck 200, thereby releasing the contact between a braking face 152 and a contacting portion 183.

Now the components disposed around the take-up reel 160, that is, a pinch roller driving device, a review arm driving device, a main brake driving device and a sub-brake, will be described sequentially below.

First, as shown in FIGS. 1 to 3 and 5E, the pinch roller driving device is provided with a lock pinch 230 in a hinge-coupled state so as to be actuated by the lever 80 driven by the third cam gear 38. Further, a pinch arm 131 provided with a pinch roller 130 is hinge-secured to the sub-deck 200, in such a manner that the tape 300 which pass around the capstan shaft 41 should be pressed to the capstan shaft 41 by means of the lock pinch 230.

The lock pinch 230 includes a lock lever 231 and a lever 232, and these two members 231 and 232 are hinge-secured to the sub-deck 200 by means of a hinge portion 233, while a spring unit 234 is resiliently installed between the two members. The took lever 231 is provided with a downward protuberance 235 on one end thereof to be guided within the guide slot 84 of the lever 80 actuated by the third cam gear 38. Meanwhile, the lever 234 on the lock lever 231 is provided with a slot 236, so that a protuberance 132 of the pinch arm 131 can be inserted into it, thereby actuating the pinch arm 131.

As shown in FIGS. 1 to 3 and 5E, the review arm driving device is provided with a review arm pole 241 at the leading end thereof inserted into the guide slot 103 of the main deck 100. Further, the review arm driving device is provided with a guide protuberance 242 at the lower end thereof, guided within the guide slot 103. Thus the review arm 240 hinge-secured to the sub-deck 200 is actuated in accordance with the moving-in and -out of the sub-deck 200 over the main deck 100.

As shown in FIGS. 1 to 3 and 5F, the main brake driving device for releasing the take-up reel 160 is constituted and operated as described below. A main brake 120 is installed at a side of the supply reel 150, and provided with a braking portion 121 on a side thereof, and with a downward protuberance 122 on other side thereof. The releasing operating is described as follows. When a slide brake 250 rises, the braking portion 121 of the main brake 120 is released from the take-up reel 160. That is, the slide brake 250 rises guided by an arcuate slot 251 and along the guide slot 84 of the lever 80 actuated by the third cam gear 38. During rising of the slide brake 250, an engaging portion 252 which is disposed at a lower part below pulls up the protuberance 122 of the main brake, with the result that the braking portion 121 of the main brake 120 is released from the take-up reel 160. The locking operation is carried out by means of a spring unit 123 of the main brake 120, and this locking operation can be performed when the forcible action of the slide brake 250 is released.

As shown in FIG. 3, the sub-brake 190 is constituted as described below. That is, a lever 191 and an arm bracket 193 are joined together by means of a hinge portion 194, the lever 191 having an arcuate face contacted with the upper braking portion of the take-up reel, the arm bracket 193 being provided with a braking portion 192 engaged with a lower gear portion 161. The lever 191 and the arm bracket 193 can be made to be spread by means of a spring unit 195, so that the sub-brake should be able to prevent reverse revolutions of the take-up reel 160.

Figure 6:
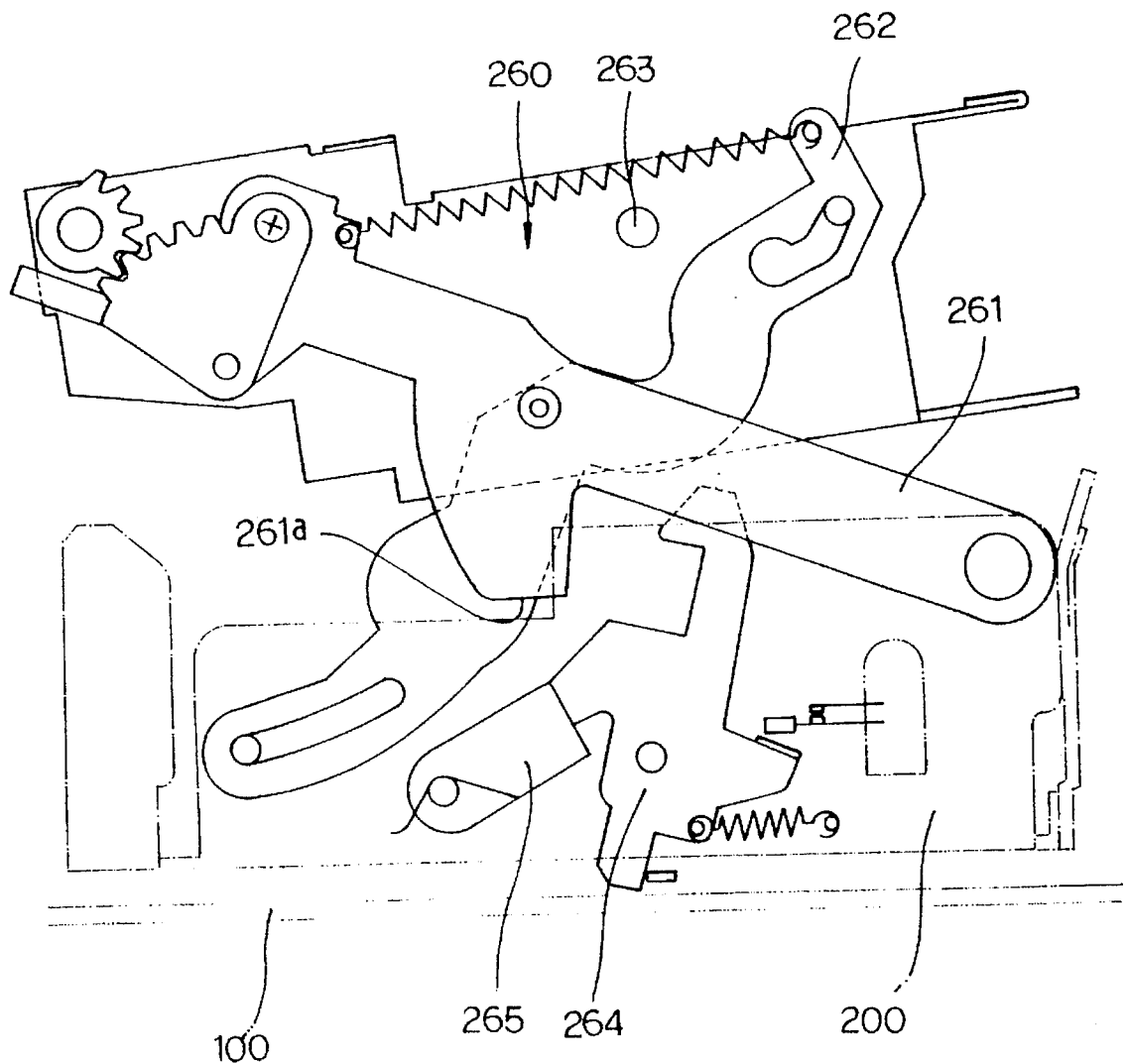
FIG. 6 is a side view showing the operation of a housing according to the present invention.
Figure 7:
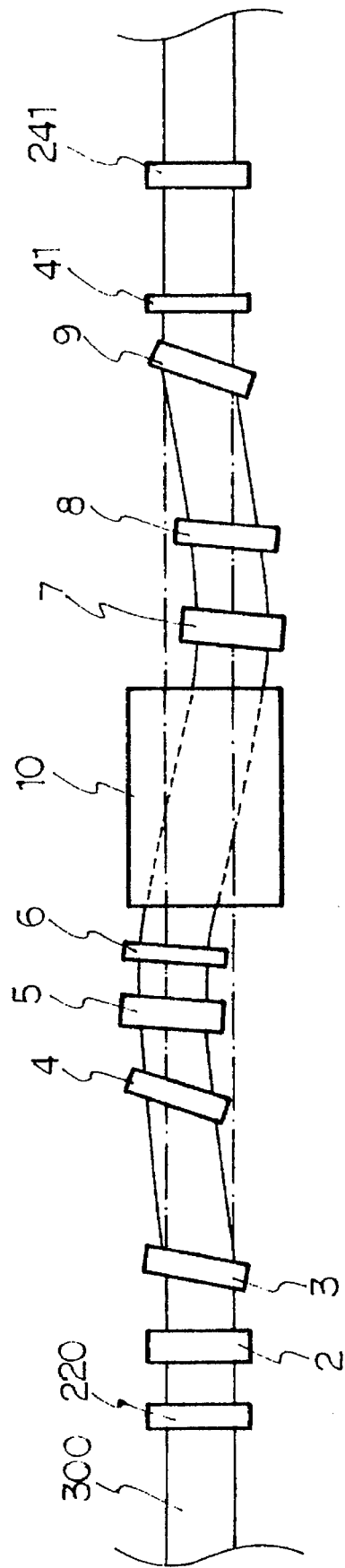
FIG. 7 shows tape guide means for guiding a tape to the upright drum according to the present invention.

FIG. 6 illustrates the operation of the housing installed on the sub-deck 200. On both sides of the sub-deck 200 and both sides of the housing 260, there are installed the middle portions of first and second levers 261 and 262 by means of hinges in a mutually crossing form.

An engaging pin 263 of the housing 260 is engaged with an engaging portion 264 formed on a side of the sub-deck 200, so that the housing should securely be settled on the sub-deck upon the descending of the first lever 261.

Figure 4:
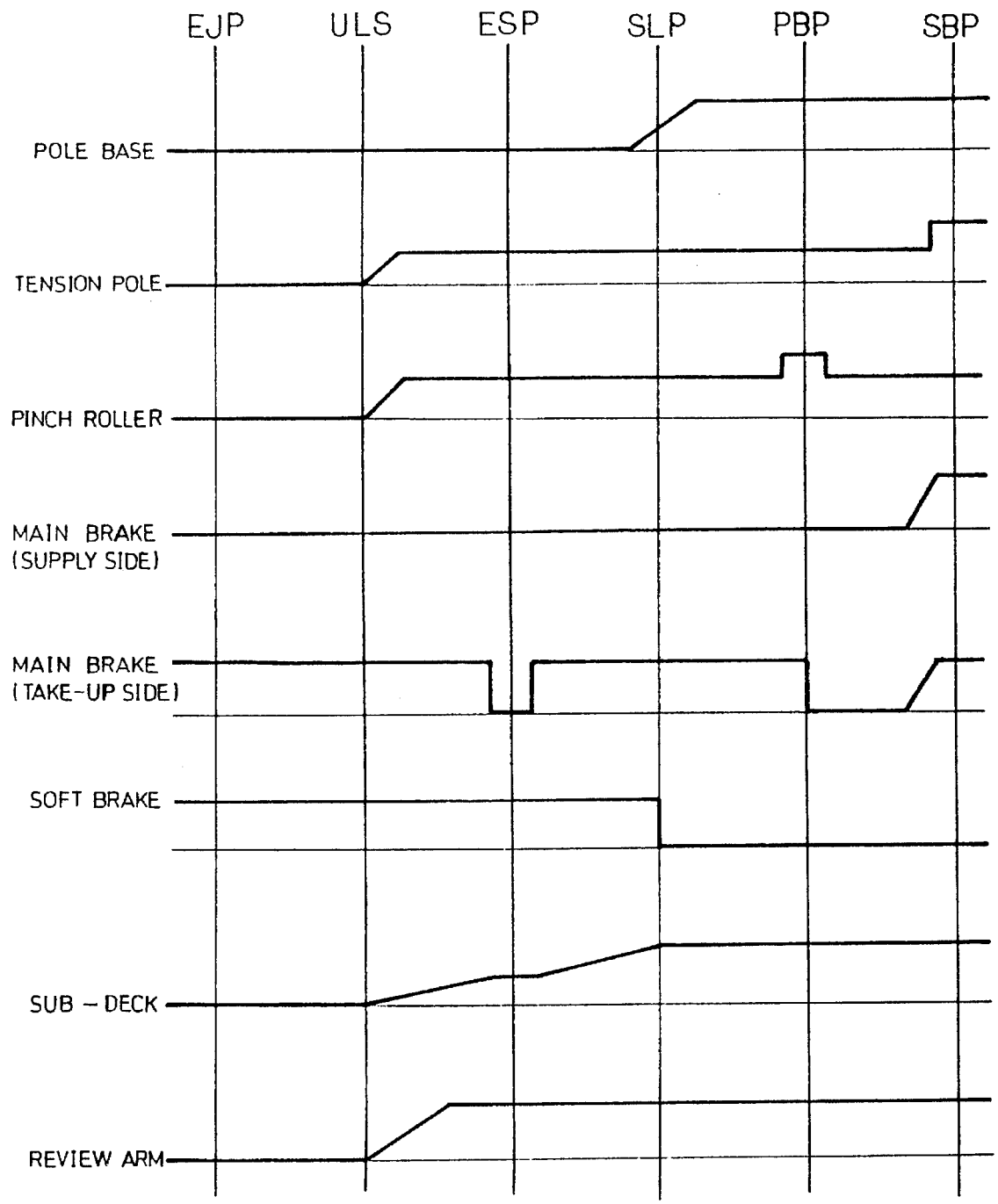
FIG. 4 is a flow chart showing operation of a video camera deck driving apparatus of the present invention.

The apparatus of the present invention constituted as above will now be described for each of positions referring to FIG. 4.

An ejecting position EJP firstly is described below. As the sub-deck 200 is withdrawn to the rear of the main deck 100, the housing 260 is open, and the soft brake 180 brakes the supply reel 150. Further, the main brake 120 and the sub-brake 190 brake the take-up reel 160, so that the tape of the take-up reel should not be unwound.

An unloading stop position ULP is next indicative of a state described below. It indicates a state before loading a tape. After a cassette has been inserted into the housing, the housing is locked, while the loading motor is revolved slightly.

The locked state of the housing is described referring to FIG. 6.

First, if the housing 260 is pushed down, the first and second levers 261 and 262, being crossingly installed, come down. Then the push portion 261a formed on the bottom of the first lever 261 pushes down the lever stopper 265 installed on a side of the sub-deck 200. Consequently, the lever stopper 265 which has been held the engaging portion 264 is released, so that the engaging portion 264 should be pivoted around the hinge portion by the elastic force of the spring, and the engaging portion 264 should be engaged with the engaging pin 262 of the descending housing 260, thereby completing the locking of the housing 260.

Upon the loading motor rotating, the respective components such as the sub-deck 200, the review arm 240, the pinch roller 130, the tension pole 220 and the like also commence actuations. The actuations of these components appear at an end sensing position ESP, and therefore, it will be described at the end sensing position ESP.

The end sensing position ESP is a momentarily appearing state in which the position of the tape is detected, and when the end of the tape is placed on the supply reel, the main brake is released from the take-up reel in order to load a tape.

At this end sensing position, the position of the idler 90 is selectively shifted in accordance with the position of the end of the tape. That is, the gear 91 engaged with the capstan motor 40 is rotated in accordance with the rotating direction of the capstan motor 40 as shown in FIG. 3. Consequently, the position of the idler 90 is selectively shifted either to the supply reel 150 or to the take-up reel 160 through the belt 92 which actuates the idler 90.

As shown in FIG. 5C, the power for the operation releasing the main brake 170 from the take-up reel 160 is transmitted in the order of: the loading motor 30—the driving gear 31—the first gear 32—the first cam gear 33—the second gear 34—the second cam gear 35—the third gear 36—the fourth gear 37—the third cam gear 38.

The third cam gear 38 that is rotated by the revolving power of the loading motor 30, and then, the lever 80 is pivoted around the hinge portion, guided by the guide pin 81 along the cam slot 38a of the third cam gear 38. Consequently, the lower protuberance 122 of the main brake is pushed by the contacting protuberance 85 of the lever 80, with the result that the main brake 120 is released from the take-up reel 160.

Further, in accordance with the pivoting of the lever 80 due to the revolutions of the third cam gear 38, the pinch roller 130 is also rotated, and this driving of the pinch roller 130 will be described referring to FIG. 5E below.

In accordance with the pivoting of the lever 80 due to the revolutions of the cam gear 38, the lower protuberance 235 of the lock pinch 230 is guided by the guide slot 84 of the lever 80, so that the lock pinch 230 should be pivoted around the hinge portion 233.

When the lock pinch 230 is pivoted, the pinch arm 131 is pivoted around the hinge portion 133 toward the capstan motor shaft 41, actuated by the lower protuberance 132 of the pinch arm 131 which is inserted into the upper slot 236 of the lever 232 of the lock pinch 230. Thus if the sub-deck 200 is elevated on the main deck 100 toward the drum 10, the pinch roller 130 installed at the leading end of the pinch arm presses the tape 300 to the capstan motor shaft 41 when the tape 300 passes round the capstan motor shaft 41.

Such a pressing operation is effected by the lock pinch 230 directly and by the third cam gear 38 indirectly as described above. That is, the capstan motor shaft 41 is pressed by the pinch roller 130 which is pushed by the force of the spring unit 234 resiliently installed on the lock pinch, i.e., between the lock lever 231 and the lever 232. Consequently, the tape is pressed between the capstan motor shaft 41 and the pinch roller 130.

The review arm 240 is also simultaneously actuated with the actuation of the pinch roller 130. The review arm pole 241 is spread out around the hinge portion 243 as the lower review arm protuberance 242 is guided along the guide slot 103 of the main deck 100. That is, the review arm 240 is pivoted as the lower protuberance 242 of the review arm 240 hinge-secured to the sub-deck 200 is guided within the guide slot 103 of the main deck 100.

Further, at this end sensing position, the tension pole 220 is actuated in order to maintain the stability of the tape during its loading. As shown in FIG. 5G, the tension pole 220 is actuated in the manner described below. That is, the lower protuberance 221 of the tension arm 222 is guided along the guide slot 211 of the slide tension 210 in accordance with the elevation of the slide tension 210 during the elevation of the sub-deck, and the tension arm 222 (with the tension pole 220 installed at the leading end thereof) pivots around the hinge portion 202.

Thereafter, a sub-loading position SLP is accomplished. At this sub-loading position, the sub-deck moves to be overlapped evenly with the main deck, thereby forming a state immediately preceding the loading of tape.

The operation of the sub-deck at this sub-loading position will be described referring to FIG. 5A.

The power of the loading motor 30 is transmitted in the order of: the driving gear 31—the first gear 32—the first cam gear 33—the second gear 34—the second cam gear 35. When the second cam gear 35 revolves, the lever 70, one end of which is hinge-secured to the main deck 100, and the other end of which has a protuberance 73 to be guided within the guide slot 71 of the sub-deck 200, is guided along the second cam slot 35b. Consequently, the sub-deck 200 moves over the main deck 100 in accordance with the revolutions of the second cam gear 35.

Further, at the sub-loading position, the soft brake 180 which has been pressing down the supply reel 150 is released so as for the tape of the supply reel 150 to be unwound, while the take-up reel 160 is braked by means of the main brake 120. Now, the operation for releasing the soft brake will be described below in detail.

As shown in FIG. 5B, the soft brake is released in the following manner when the sub-deck 200 is moved, the bottom 182 of the soft brake 180 is engaged with the screw member 204 installed on the bottom of the main deck 100, and inserted into the elongate guide slot 203 of the sub-deck 200. Consequently, the soft brake 180 pivots around the hinge portion, so that the contact portion 183 which has been pressing down the outside of the tension band 151 is separated from the outer face of the tension band 151 wound on the braking surface of the supply reel 150.

The operation for braking the take-up reel is performed next to the operation for releasing the main brake 120 from the take-up reel 160 as illustrated in FIG. 5C. When the lever 80 descends being guided by the cam slot 38a during the continuous revolutions of the third cam gear 38, the contacting protuberance 85 which has been engaged with the lower protuberance 122 of the main brake 120 departs therefrom. Consequently, the main brake 120 is restored by the spring unit 123, with the result that the take-up reel 160 is braked by the main brake 120.

A playing back position PBP, a state performed next to the sub-loading position is a step of regenerating a picture after loading a tape, and this will be described starting from the operations of the pole bases 110 and 110a.

Figure 5D:
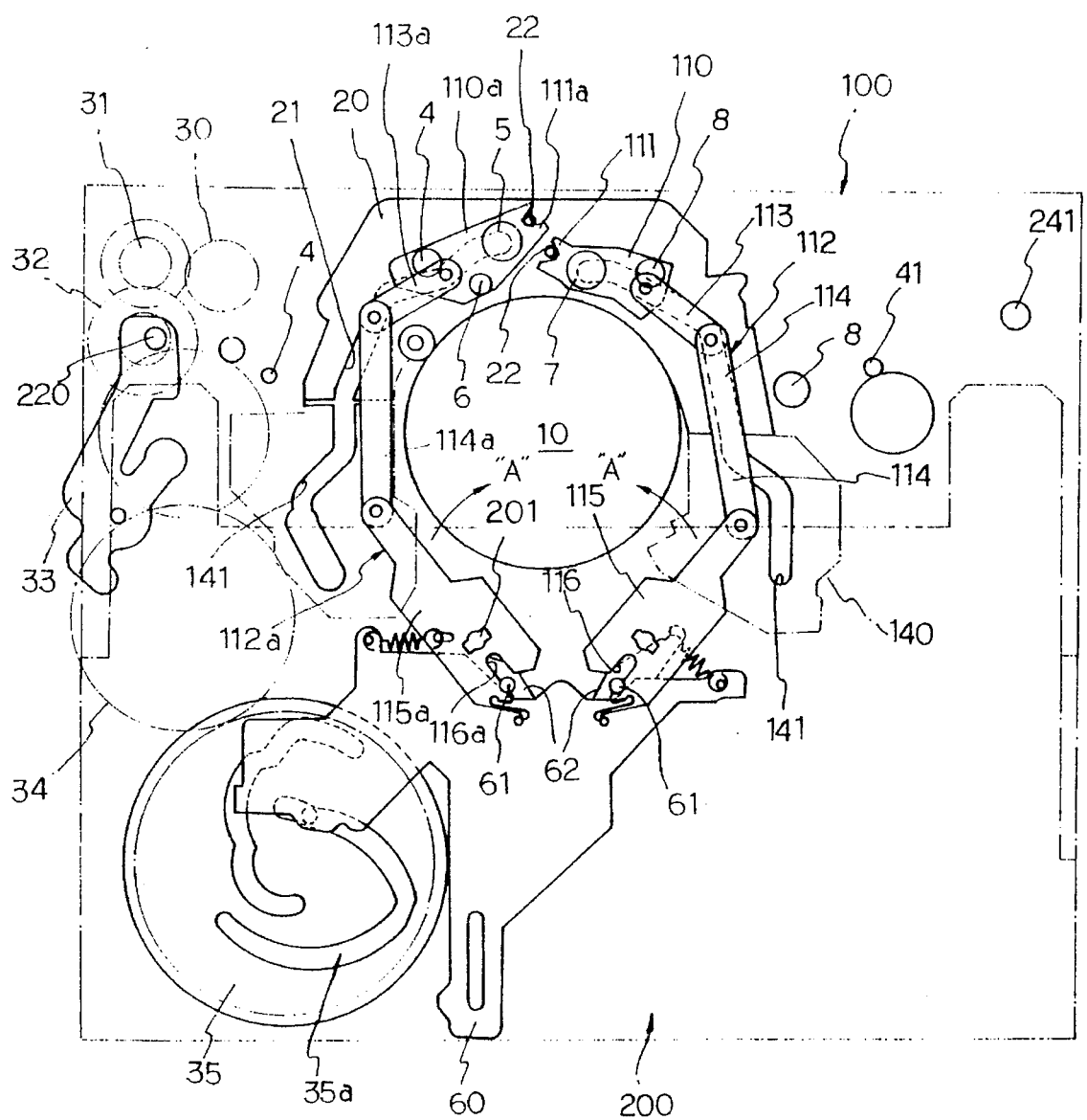
Figure 5G:
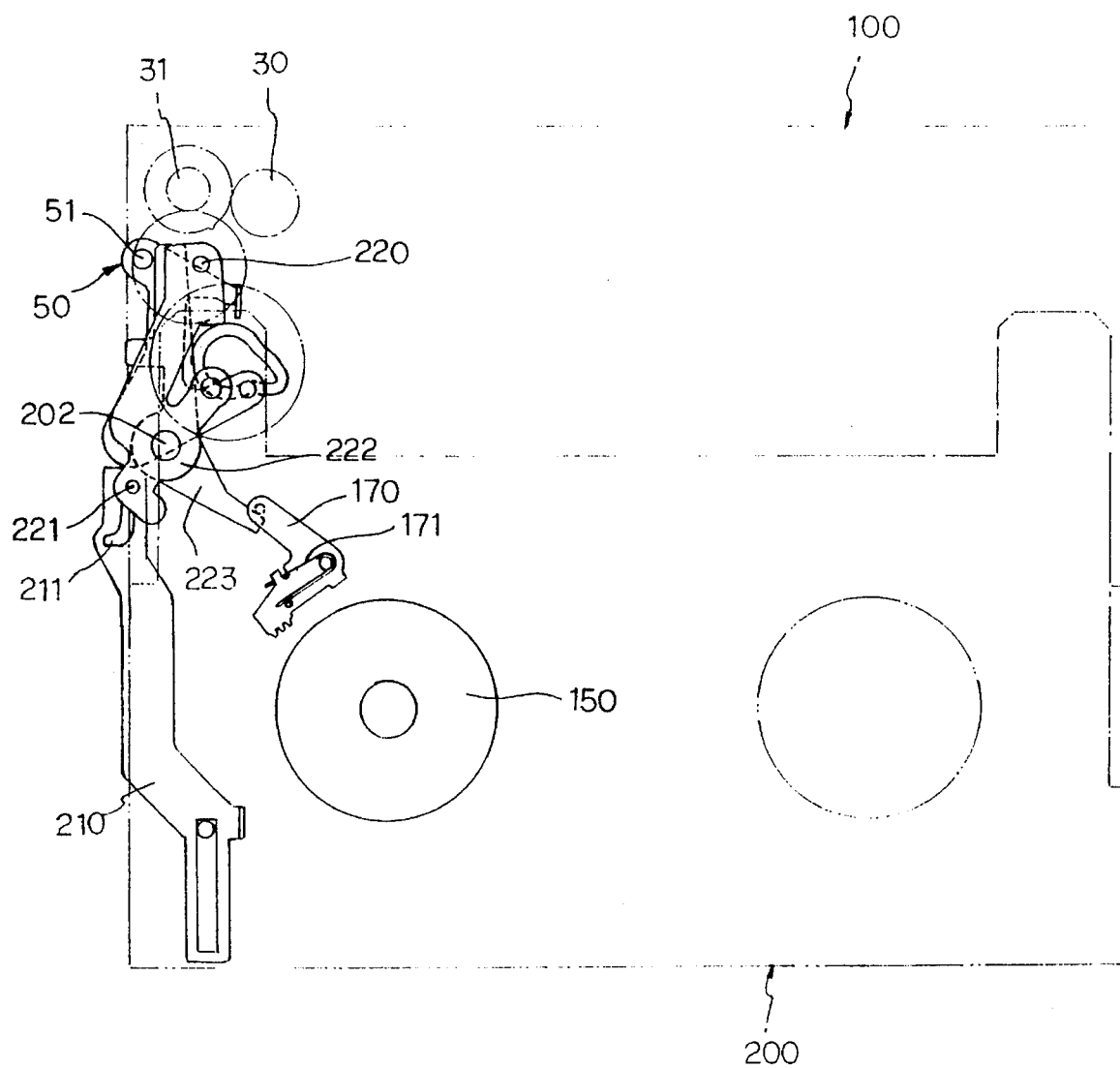
FIG. 5G is a plan view for explaining the operation of a tension pole and the operation of the main brake for controlling a supply reel.

As shown in FIG. 5D, as described at the sub-loading position, when the main deck 100 and the sub-deck 290 are overlapped evenly, the loading slot 21 of the drum base 20 of the main deck 106 is matched with the loading slot 141 of the rail guide 140 of the sub-deck 200. Consequently, there is accomplished a state for guiding the pole bases 110 and 110a in order to carry out a loading, and, in this state, both of the loading arm assemblies 112 and 112a are elevated by receiving power from the loading motor 30, thereby loading a tape 366.

That is, the driving power of the loading motor 30 is transmitted in the order of: the driving gear 31—the first gear 32—the first cam gear 33—the second gear 34—the second cam gear 35. Accordingly, when the plate slider 60 guided along the first cam slot 35a of the second cam gear 35 descends, the slots 116 and 116a are engaged with the pins 61 of the lever 62 of the plate slider 66 which is installed on the main deck 100. Meanwhile, the loading arms 115 and 115a, which have a hinge portion 201 hinge-secured to the hinge portion of the sub-deck 200, are pivoted in the directions of arrow marks A.

Thus, when the two loading arms 115 and 115a are pivoted, the components such as the second arms 114 and 114a, the first, arms 113 and 113a and the pole bases 110 and 110a are upwardly guided from the loading slot 141 of the guide rail 146 to the loading slot 21 of the drum base 20.

Under this condition, the loading is made in such a manner that the pole bases 110 and 116a should face against the upright drum 10 after being guided along the both loading slots 21 with slightly different height.

In this state, the power of the continuously revolving second cam gear 35 continuously lowers the plate slider 60, and therefore, the loading arms 115 and 115a receive forces in the directions of the arrow mark A, and therefore the pole bases 110 and 110a should tend to move continuously along the loading slot 21 of the drum base 20. However, after the pole bases 110 and 110a have been completely moved into the loading slot 21, the stoppers 111 and 111a having V shaped recesses are coupled with the stopper pins 22 of the drum base 20, with the result that no further movement is allowed.

Under this condition, stresses are given to the pin 61 of the plate slider 60 subjected to a force for continuous movements, the levers 62 installed on a side of the plate slider 60 by means of the hinge portion 201 of the loading arms 115 and 115a of the sub-deck 200, and the spring 63 installed between the plate slider 60 and the lever 62. Consequently, the force of the spring 63 acts on the loading arm assemblies 112 and 112a, so that the loading arms 112 and 112a should exert elastic forces to the tension of the running tape 300.

As described above, when loading a tape by driving the pole bases, the pinch roller pressingly contacts with the capstan motor shaft, so that the tape should be run by the take-up reel. Under this condition, the main brake which has been braking the take-up reel is released. As to the driving (including the pressing contact) of the pinch roller, it was described at the end sensing position referring to FIG. 5E, and therefore, a further description of it will be skipped.

Meanwhile, the above mentioned operation for releasing the main brake which has been braking the take-up reel is different from the releasing of the main brake from the take-up reel in the end sensing position. Therefore, the operation for releasing the main brake in the playing back position will be described referring to FIG. 5F.

The power from the loading motor 30 is transmitted in the order of: the driving gear 31—the first gear 32—the first cam gear 33—the second gear 34—the second cam gear 35—the third gear 36—the fourth gear 37—the third cam gear 38. The lever 80 is driven by the third cam gear 38, and according to the operation of the lever so, the slide brake 250 having an elongate arcuate slot 251 is lifted by the protuberance 235 of the lock lever 231 inserted into the guide slot 84 of the lever 80 and a elongate slot formed on the sub-deck 200. At the same time, the protuberance 122 of the main brake 120 engaged with the lower engaging portion 252 of the slide brake 250 is pulled up being guided along the elongate slot 206 of the sub-deck 200, with the result that the main brake 120 is released.

A standby position SBP succeeds the play back position, and this standby position is a waiting state before pictures during regenerating at the play back position is stopped to operate the desired position. During this standby position, the two reels 150 and 160 are braked by means of the two main brakes 120 and 170, and the pinch roller 130 is separated from the capstan motor shaft 41. Thus the running of the tape is stopped, and the tension pole 220 is made to be slightly loose in order to protect the loaded tape. The actuations of the main brakes 120 and 170 and the pinch roller 130, which are carried out at the standby position, have been described above, and therefore, further details of them will be skipped.

According to the present invention as described above, the drum is installed on the main deck in an upright posture, and the sub-deck can move closely to the drum on the main deck. Therefore, the size of video camera can be reduced to a great degree, thereby making it possible to miniaturize video camera.

What is claimed is:

1. A video camera deck driving apparatus, comprising:

a main deck with a drum installed thereon and a sub-deck movable from a first position spaced apart from said main deck to a second position adjacent to said drum, said drum being installed to rotate around an axis extending perpendicularly from said main deck;

a supply reel;

a main brake for preventing rotation of said supply reel;

a hinge-coupled lever;

tape guide means for guiding a tape toward said drum;

an actuating lever;

a first guide pin positioned on said actuating lever;

a first cam gear positioned on said main deck to receive rotational power from a motor installed on said main deck, said first cam gear having a first cam slot for accommodating said first guide pin, said actuating lever engaging a first end of said hinge-coupled lever with a second end of said hinge-coupled lever opposite said first end engaging and releasing said main brake of said supply reel as said first guide pin travels through said first cam slot during rotation of said first cam gear;

sub-deck moving means for moving said sub-deck to said second position adjacent to said drum to load said tape onto said drum, said sub-deck moving means comprising:

a second cam gear having second and third cam slots for respectively accommodating second and third guide pins, said second cam gear positioned on said main deck to receive rotational power via said first cam gear from the motor;

a pair of loading arms; and arm moving means for engaging and moving said pair of loading arms in a direction towards said perpendicular drum when said arm moving means moves relative to said main deck from an upper position to a lower position, said arm moving means having said second guide pin guided within said second cam slot of said second cam gear for lifting and lowering said arm moving means with said pair of loading arms being moved by rotation of said second cam gear;

a drum base having upper loading slots and lower loading slots separately formed upon said drum base for guiding pole bases to said chum;

a take-up reel;

main braking means for preventing rotation of said take-up reel;

pivoting lever;

a fourth guide pin extending from a bottom portion of said pivoting lever; and a third cam gear positioned on said main deck to receive rotational power via said second cam gear from said motor, said third cam gear having a fourth cam slot for accommodating said fourth guide pin, said pivoting lever moving in dependence upon rotation of said third cam gear, said pivoting lever having a guide slot formed on a first end and a contact protuberance formed on a second end opposite said first end, said movement of said pivoting lever causing said contact protuberance to engage and release said main braking means of said take-up reel and further causing said guide slot to engage lock pinch means for enabling a pinch roller to press said tape into contact with a capstan shaft.

2. The apparatus as claimed in claim 1, wherein said tape guide means comprises:

a tension pole and a first guide roller for guiding said tape in a direction parallel to said main deck, passing between said tension pole and said first guide roller defining a plane extending said tape perpendicularly to said main deck;

a first inclined pole and a second inclined pole for guiding said tape in a direction oblique to said main deck with said plane of said tape being oblique to said main deck after said tape is guided by said tension pole and said first guide roller;

a second guide roller and a guide pole disposed between said second inclined pole and the drum for placing said tape in operational contact with said perpendicular drum;

a third guide roller, a third inclined pole and a fourth inclined pole for restoring said tape to travel in said direction parallel to said main deck with said plane of said tape being perpendicular to said main deck;

said pinch roller pivotally attached to said sub-deck moving means, for supplying said tape to said take-up reel by pressing said tape into contact with said capstan shaft after said tape is guided by said fourth inclined pole; and a review arm pole for guiding said tape to said take-up reel after said tape passes between said pinch roller and said capstan shaft.

3. The apparatus as claimed in claim 1, wherein said sub-deck moving means further comprises:

a sub-deck actuating lever having said third guide pin for being guided within said third cam slot of said second cam gear, a first end of said sub-deck actuating lever being pivotally connected to said main deck and a second end of said sub-deck actuating lever being provided with a protruding pin disposed to travel within an elongated slot of a guide portion installed on said sub-deck in an angularly adjustable form.

4. The apparatus as claimed in claim 1, wherein each of said pole bases is provided with a stopper having a "V" shaped recess at a leading end thereof, and said dram base is provided with stopper pins so that each said stopper is pressingly coupled with a corresponding one of said stopper pins.

5. The apparatus as claimed in claim 1, further comprised of heights of left and right portions of said loading slots being different from each other.

6. The apparatus as claimed in claim 1, further comprised of said drum helically scanning information tracks formed on said tape as said drum rotates around said axis.

7. A video camera deck driving apparatus, comprising:

a drum;

a main deck with said drum installed upon said main deck and a sub-deck movable from a first position spaced apart from said main deck to a second position adjacent to said drum, said drum being installed to rotate around an axis extending perpendicularly to said main deck;

tape guide means for guiding a tape toward said drum, said tape guide means comprising:

a tension pole and a first guide roller for guiding said tape in a direction parallel to said main deck with an orientation defined by a plane of said tape being perpendicular to said main deck;

a first inclined pole and a second inclined pole for guiding said tape in a direction oblique to said main deck with said plane of the tape being oblique to said main deck after the tape is guided by said tension pole and said first guide roller;

a second guide roller and a guide pole for placing the tape in operational contact with said perpendicular drum;

a third guide roller, a third inclined pole and a fourth inclined pole for restoring the tape so that said tape travels in said direction parallel to said main deck with said plane of said tape being perpendicular to said main deck;

a pinch roller hinge-secured to said sub-deck moving means for supplying said tape to a take-up reel by pressing said tape into contact with a capstan shaft after said tape is guided by said fourth inclined pole; and a review arm pole for guiding said tape to a take-up reel after the tape passes between said pinch roller and said capstan shaft;

a drum base having upper loading slots and lower loading slots separately formed thereon for guiding pole bases to said drum;

a supply reel;

a main brake for preventing rotation of said supply reel;

a hinge-coupled lever;

an actuating lever;

a first guide pin positioned on said actuating lever;

a first cam gear positioned on said main deck to receive rotational power from a motor installed on said main deck, said first cam gear having a first cam slot for accommodating said first guide pin, said actuating lever engaging a first end of said hinge-coupled lever so that a second end of said hinge-coupled lever opposite said first end engages and releases said main brake of said supply reel as said first guide pin travels through said first cam slot during rotation of said first cam gear;

sub-deck moving means for moving said sub-deck to said second position adjacent to said drum to load the tape onto said drum, said sub-deck moving means comprising:

first and second loading arms;

a second cam gear having second and third cam slots, said second cam gear being provided with rotational power via said first cam gear from said motor;

a plate having a second guide pin guided within said second cam slot for lifting and lowering said plate, said plate engaging and moving said first and second loading arms in a direction towards said perpendicular dram when said plate moves relative to said main deck from an upper position to a lower position with said first and second loading arms being moved by rotation of said second cam gear; and a sub-deck actuating lever having a third guide pin for being guided within said third cam slot of said second cam gear, one end of said sub-deck actuating lever being pivotally connected to said main deck and a second end provided with a protruding pin disposed to travel within an elongated slot of a guide portion installed on said sub-deck in an angularly adjustable form;

lock pinch means for enabling said pinch roller to press said tape into contact with said capstan shaft;

pivoting lever;

a fourth guide pin extending from a bottom portion of said pivoting lever; and a third cam gear positioned on said main deck to receive rotational power via said second cam gear from the motor, said third cam gear having a fourth cam slot for accommodating said fourth guide pin, said pivoting lever moving in dependence upon rotation of said third cam gear, said pivoting lever having a guide slot formed on a first end and a contact protuberance formed on a second end opposite from said first end, said movement of said pivoting lever causing said contact protuberance to engage and release main braking means of said take-up reel and further causing said guide slot to engage said lock pinch means.

8. The apparatus as claimed in claim 7, wherein each of said pole bases is provided with a stopper having a "V" shaped recess at a leading end thereof, and said drum base is provided with stopper pins so that each said stopper is pressingly coupled with a corresponding one of said stopper pins.

9. The apparatus as claimed in claim 7, wherein said pole bases face said drum and are provided with said second and third guide rollers and said second and third inclined poles for controlling direction and angular orientation of said tape.

10. The apparatus as claimed in claim 7, wherein said plate is connected to first lever means by a first resilient coupler and is further connected to second lever means by a second resilient coupler, said first and second resilient couplers respectively biasing said first and second loading arms to apply a tension on said tape.

11. The apparatus as claimed in claim 10, wherein said first and second loading arms each have a hinge portion pivotally connected to said sub-deck, each of said first and second loading arms containing a slot for respectively engaging first and second pins respectively positioned on said first and second lever means to bias said first and second loading arms.

12. The apparatus as claimed in claim 7, wherein said first and second loading arms pivot to enable said pole bases to be respectively guided to said upper and lower loading slots of said drum base.

13. The apparatus as claimed in claim 7, further comprised of said drum helically scanning information tracks formed on said tape as said drum rotates around said axis.

14. The apparatus as claimed in claim 7, further comprising soft braking means for contacting an outer face of a tension band to further prevent rotation of said supply reel.

15. The apparatus as claimed in claim 7, further comprising said main braking means having first and second ends, said first end being resiliently biased to cause said second end to contact said take-up reel, and prevent rotation of said take-up reel.

16. A video camera deck driving apparatus, comprising:

a drum;

a main deck with said drum installed upon said main deck and a sub-deck movable from a first position spaced apart from said main deck to a second position adjacent to said drum, said drum being installed to rotate around an axis extending perpendicularly to said main deck;

tape guide means for guiding a tape toward said drum, said drum helically scanning information tracks formed on said tape;

supply reel;

a main brake for preventing rotation of said supply reel;

a hinge-coupled lever;

an actuating lever;

a first guide pin positioned on said actuating lever;

a first cam gear positioned on said main deck to receive rotational power from a motor installed on said main deck, said first cam gear having a first cam slot for accommodating said first guide pin, said actuating lever engaging a first end of said hinge-coupled lever with a second end of said hinge-coupled lever opposite said first end engaging and releasing said main brake of said supply reel as said fast guide pin travels through said first cam slot during rotation of said first cam gear;

sub-deck moving means for moving said sub-deck adjacently to said drum to load said tape onto said drum, said sub-deck moving means comprising:

a pair of loading arms;

a second cam gear having second and third cam slots, said second cam gear being positioned on said main deck to receive rotational power via said first cam gear from said motor;

a plate having a second guide pin guided within said second cam slot for lifting and lowering said plate, said plate engaging and moving said pair of loading arms in a direction towards said perpendicular drum when said plate moves relative to said main deck from an upper position to a lower position with said pair of loading arms being moved by rotation of said second cam gear; and a sub-deck actuating lever having a third guide pin for being guided within said third cam slot of said second cam gear, a first end of said sub-deck actuating lever being pivotally connected to said main deck and a second end of said sub-deck actuating lever being provided with a protruding pin disposed to travel within an elongated slot of a guide portion installed on said sub-deck in an angularly adjustable form;

a drum base having upper loading slots and lower loading slots separately formed upon said drum base for guiding pole bases to said drum;

a take-up reel;

main braking means for preventing rotation of said take-up reel;

a pinch roller for supplying said tape to said take-up reel by pressing said tape into contact with a capstan shaft;

a pivoting lever;

a fourth guide pin extending from a bottom portion of said pivoting lever; and a third cam gear positioned on said main deck to receive rotational power via said second cam gear from the motor, said third cam gear having a fourth cam slot for accommodating said fourth guide pin, said pivoting lever moving in dependence upon rotation of said third cam gear, said pivoting lever having a guide slot formed on a first end and a contact protuberance formed on a second end opposite said first end, said movement of said pivoting lever causing said contact protuberance to engage and release said main braking means and further causing said guide slot to engage lock pinch means for enabling said pinch roller to press said tape into contact with said capstan shaft.

17. The apparatus as claimed in claim 16, further comprising soft braking means for contacting an outer face of a tension band to further prevent rotation of said supply reel.

18. The apparatus as claimed in claim 16, further comprising said main braking means having first and second ends, said first end being resiliently biased to cause said second end to contact said take-up reel, thus preventing rotation of said take-up reel.

19. The apparatus as claimed in claim 16, further comprised of heights of left and right portions of said loading slots being different from each other for loading said tape toward said drum.

* * * * *